2 Sheets—Sheet 1.
E. A. CALAHAN.
Printing Telegraph.
No. 76,993.
Patented April 21, 1868.
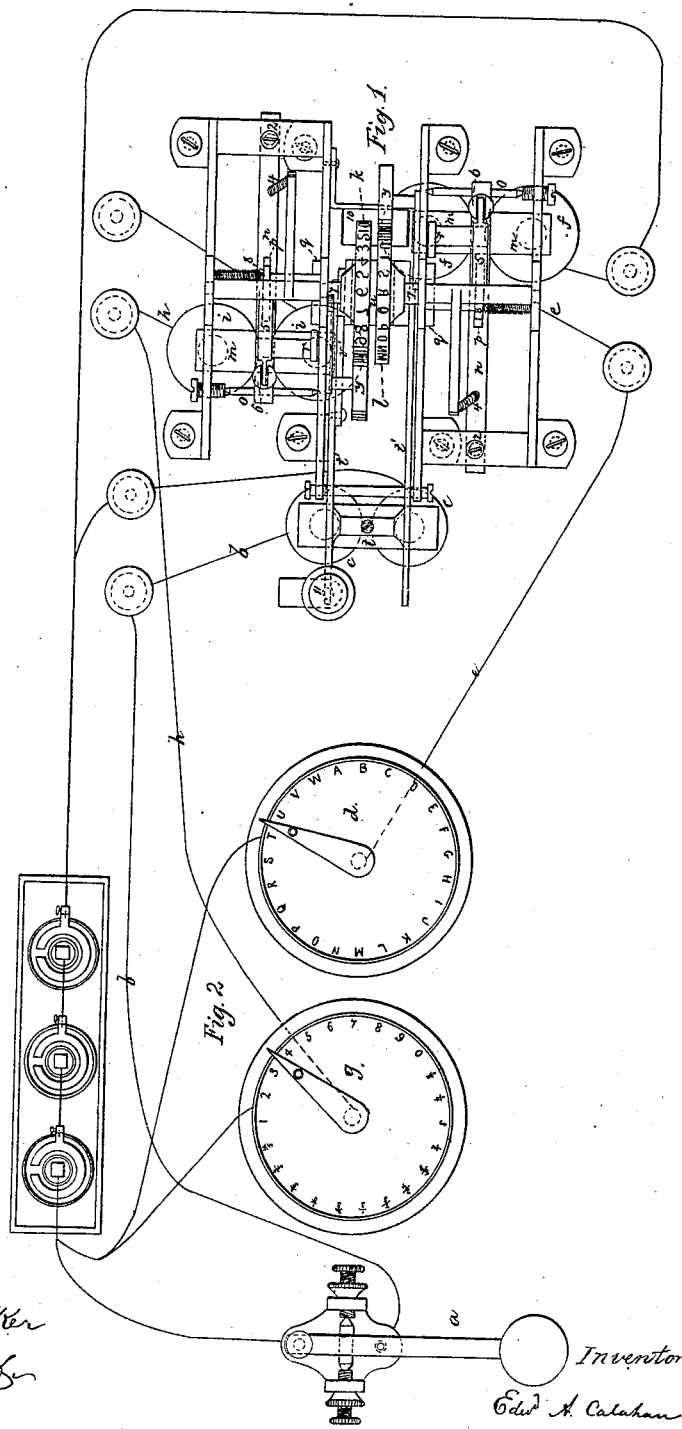

E. A. CALAHAN.
Printing Telegraph.

No. 76,993. 2 Sheets—Sheet 2. Patented April 21, 1868.

Witnesses: Geo. D. Walker, Chas. H. Smith

Inventor. Edw. A. Calahan.

UNITED STATES PATENT OFFICE.

EDWARD A. CALAHAN, OF BROOKLYN, NEW YORK, ASSIGNOR TO THE GOLD AND STOCK TELEGRAPH COMPANY, OF NEW YORK CITY.

IMPROVEMENT IN PRINTING-TELEGRAPHS.

Specification forming part of Letters Patent No. 76,993, dated April 21, 1868.

*To all whom it may concern:*

Be it known that I, EDWARD A. CALAHAN, of Brooklyn, in the county of Kings and State of New York, have invented, made, and applied to use a certain new and useful Improvement in Telegraphic Printing-Instruments for Registering Gold, Stocks, &c.; and I do hereby declare the following to be a full, clear, and exact description of the said invention, reference being had to the annexed drawings, making part of this specification, wherein—

Figure 3:
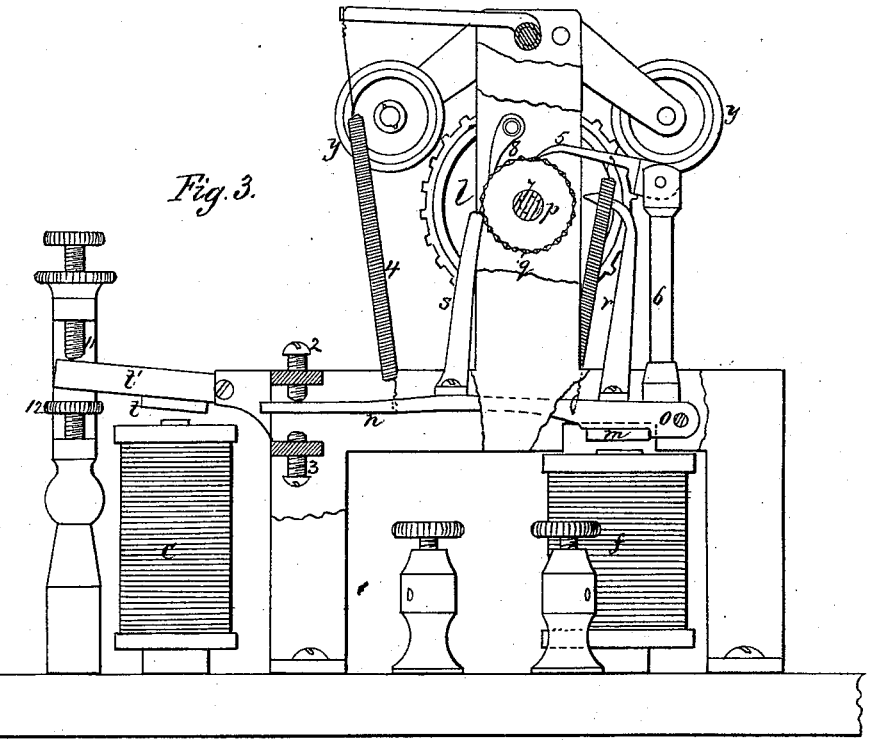

Figure 1 is a general plan of said apparatus. Fig. 2 is a plan in smaller size, illustrating the manner in which the wires are arranged in respect to the receiving and transmitting instruments. Fig. 3 is an elevation of the receiving-instrument, the frame being partially broken open.

Similar marks of reference denote the same parts.

It is often desired, particularly in large cities, to keep a correct record of various fluctuations in the price of gold, stocks, and articles of trade, and to have these fluctuations simultaneously and periodically denoted and registered at the various centers of business, connecting with one central transmitting-station.

My invention is intended to accomplish the said objects in a very reliable manner, and to dispense with the complicated mechanism heretofore made use of to cause an impression to be made when the type-wheel has been brought to the proper position.

As the different machines will generally be but a short distance apart, I make use of two or more wires communicating through the entire circuit of machines. One of these wires transmits the pulsations of electricity that acts upon a magnet and adjusts the type-wheel to the proper letter or number. The other wire transmits the pulsations of electricity, which, acting in a magnet, produces the impression upon the paper.

I have represented in the drawings three circuit-wires—one for the alphabet-wheel, another for the number or figure wheel, and the third for giving the impression.

In the drawings, $a$ is a finger-key in the circuit $b$ to the magnet $c$.

$d$ is a transmitting-instrument formed with a hand that is moved around from one letter to another, and in so doing makes and breaks the circuit $e$ to the letter-wheel, magnet $f$ giving a pulsation of electricity for each letter.

$g$ is a transmitting number instrument, formed to correspond, generally, with the letter-transmitting instrument $d$; and $h$ is the circuit thereof to the magnet $i$ of the number-wheel $k$.

The finger-key $a$ and dials $g$ and $d$, being known, do not require further description, and I remark that the mode of arranging several receiving-instruments in a line so as to be worked by one battery is well known, the connections being such that all the magnets $f$ are in the circuit $e$, and so on.

The type-wheels $k$ and $l$ are provided with the desired letters, numbers, or characters. I have shown the wheel $k$ as formed with numerals and fractions for printing the required prices, and the wheel $l$ is provided with the necessary letters of the alphabet, so as to be used in printing names.

The mechanism between the magnets and the respective type-wheels being the same, it is only necessary to describe the same on one side of the machine. The armature $m$, with its lever $n$, swings on the axis $o$, and the amount of motion is regulated by the screws 2 and 3; and 4 is a spring to lift the armature and lever.

5 is a pawl on the arm 6 of the armature $m$, that acts to turn the ratchet-wheel $p$ upon the shaft 7 of the type-wheel one tooth each time the magnet is charged.

8 is a pawl to keep the wheel $p$ from turning back.

$q$ is a second ratchet-wheel on the shaft 7, its teeth standing the reverse to the teeth of the wheel $p$; and $r$ and $s$ are pawl-arms from the lever $n$, taking on opposite sides of the wheel $q$. It will now be seen that when the armature is attracted by the magnet, the pawl 5 turns the type-wheel one letter by acting on the ratchet $p$, and at the same time the pawl-arm $r$ takes one of the teeth of the reverse ratchet-wheel $q$, rendering it impossible for the momentum to turn the type-wheel too far, and effectually blocking the same. As the electrical circuit is broken and the armature rises, the arm $s$ comes against the ratchet $q$, to prevent motion while the printing is being performed. This arrangement of mechanism insures great accuracy in the movement of the type-wheels and prevents mistakes when the movement is rapid. The two type-wheels $k$ and $l$, although on separate shafts, stand on line with each other, so as to be impressed separately or jointly upon the same strip of paper that is fed along beneath them.

The means for printing are the magnet $c$ and finger-key $a$, so that whenever either or both type-wheels are properly set the finger-key $a$ is to be closed, to operate by the magnet $c$ on the armature $t$ and throw the impression roller or surface $u$ upward, carrying with it the paper strip $x$ and impressing it upon the type or types.

Figure 4:
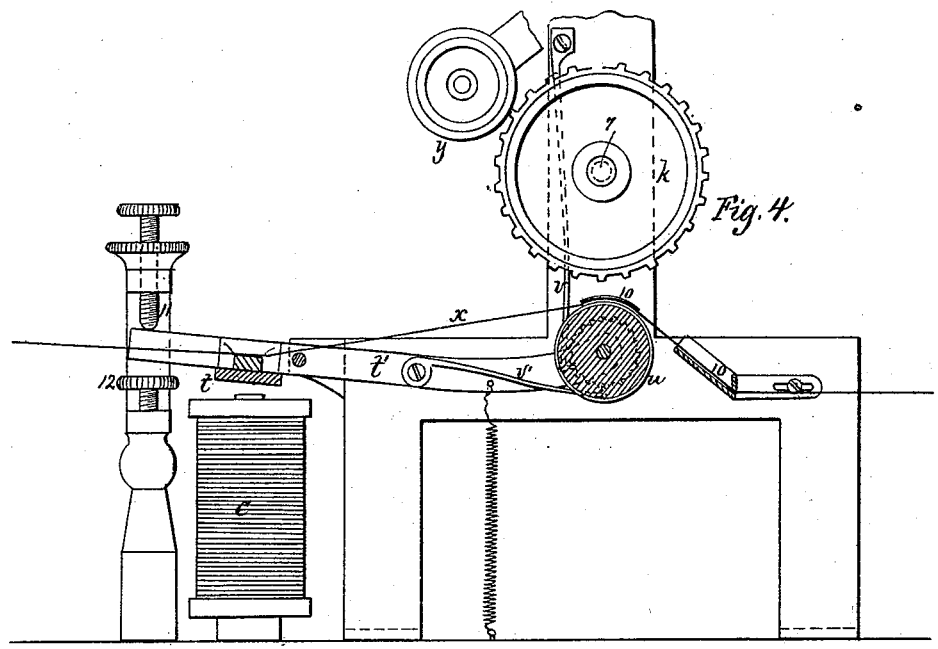

I have shown the roller $u$ (see Fig. 4) as operated upon by the hanging pawl $v$ to turn the same the amount necessary to feed the paper along, and the pawl $v'$ on the armature-lever frame $t'$ prevents the roller $u$ turning back. The paper is guided in the loops or guides 10, and the motion of the armature is regulated by the screws 11 and 12.

It will now be understood that this apparatus is especially adapted to giving simultaneously at different points, and with great reliability, the most recent quotations in the price of gold, stocks, or other articles as the same may be reported at a central station. Each of the wheels $l$ and $k$ has a blank space that is turned toward the paper while the other wheel only is being printed from. The inking-rollers $y$ $y$, in contact with the respective type-wheels, serve to ink the same. The roller that feeds the paper along might be operated by ratchet-wheels and pawls similar to those that move the type-wheels. The magnet that gives the impression may be placed directly in the main electric circuit, or it may be operated from the main current by a relay and local circuit.

This machine does not require any attention, except to supply paper from time to time and moisten the inking-rollers, because all the movements of the receiving and registering mechanism are effected by the electricity itself, thus rendering the machine entirely automatic.

What I claim, and desire to secure by Letters Patent, is—

1. A magnet for giving or controlling the impression, placed in a main electrical circuit that is separate from the circuit that controls the type-wheel or denoting device, so that the impression can be made independently of any other operation when the type-wheel or denoting device has been properly moved, substantially as set forth.

2. Two or more type-wheels separately controlled by magnetism, and arranged side by side or with their axis on the same line, so as to be impressed jointly or separately on one strip of paper, substantially as and for the purposes set forth.

3. The combination of the type-wheels $k$ and $l$, magnets $f$ and $i$, with the magnet $c$ and impression-roller $u$ or its equivalent, substantially as and for the purposes set forth.

4. The reverse ratchet-wheel $q$ and pawl-arm $r$, in combination with the ratchet-wheel $p$ and pawl 5, for moving and holding the type or character wheel, substantially as set forth.

In witness whereof I have hereunto set my signature this 28th day of December, A. D. 1867.

EDWD. A. CALAHAN.

Witnesses:
CHAS. H. SMITH,
GEO. DENNETT WALKER.